United States Patent [19]

Vo

[11] 4,376,639
[45] Mar. 15, 1983

[54] NOVEL REPRESSURIZATION OF PRESSURE SWING ADSORPTION SYSTEM

[75] Inventor: Toan P. Vo, Pittsburgh, Pa.

[73] Assignee: Calgon Corporation, Robinson Township, Indiana County, Pa.

[21] Appl. No.: 329,144

[22] Filed: Dec. 10, 1981

[51] Int. Cl.³ .............................................. B01D 53/04
[52] U.S. Cl. ........................................ 55/26; 55/58; 55/62; 55/68; 55/75
[58] Field of Search .................... 55/25, 26, 33, 58, 62, 55/68, 74, 75

[56] References Cited

U.S. PATENT DOCUMENTS

| | | | |
|---|---|---|---|
| 1,617,305 | 2/1927 | Guyer et al. | 55/58 |
| 3,149,934 | 9/1964 | Martin | 55/58 |
| 3,176,444 | 4/1965 | Kiyonaga | 55/26 |
| 3,338,030 | 8/1967 | Feldbauer, Jr. | 55/58 X |
| 3,564,816 | 2/1971 | Batta | 55/62 X |
| 3,636,679 | 1/1972 | Batta | 55/26 |
| 3,923,477 | 12/1975 | Armond et al. | 55/25 |
| 3,944,400 | 3/1976 | Bird | 55/21 |
| 4,011,065 | 3/1977 | Munzner et al. | 55/58 X |
| 4,015,956 | 4/1977 | Munzner et al. | 55/58 X |
| 4,264,339 | 4/1981 | Juntgen et al. | 55/25 |
| 4,299,596 | 11/1981 | Benkmann | 55/26 |
| 4,340,398 | 7/1982 | Doshi et al. | 55/58 X |

*Primary Examiner*—Robert H. Spitzer
*Attorney, Agent, or Firm*—Martin L. Katz; Ernest V. Linek

[57] ABSTRACT

Gaseous mixtures are separated on a two zone (two columns connected in series per zone) carbon molecular sieve pressure swing adsorption system to produced a gas stream enriched in at least one component. This process includes the partial pressurization of an adsorbent zone with lean gas in the range of 40 to 90 percent of the adsorption pressure.

3 Claims, 1 Drawing Figure

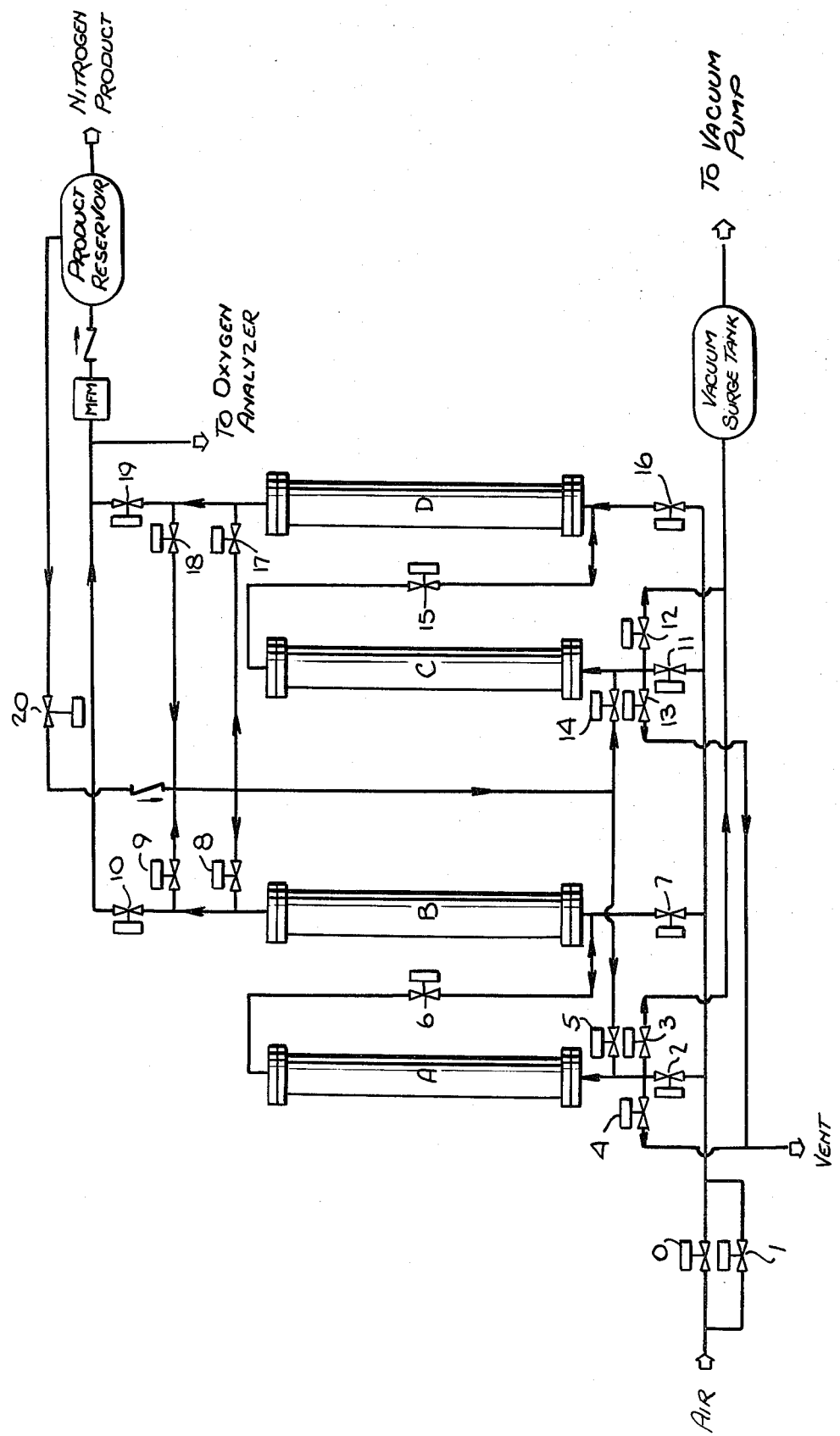

NOVEL REPRESSURIZATION OF PRESSURE SWING ADSORPTION SYSTEM

BACKGROUND OF THE INVENTION

This invention relates to a method for obtaining in large volume a gas stream that is 90%-99% and higher by volume in one component of a gaseous mixture. This invention especially relates to an adsorption process for providing an enriched gas stream by means of a pressure swing adsorption system using carbon molecular sieves.

More particularly, this invention relates to a method for providing an inexpensive and high volume source of gases such as nitrogen, hydrogen or methane, requiring less energy to operate than either cryogenic or other pressure swing adsorption systems, and yet supplying gases of comparable quality.

The term gaseous mixture, as used herein, refers to air and other gas mixtures primarily comprised of at least two components of different molecular size. The term enriched gas refers to a gas comprised of that component of the gaseous mixture relatively unadsorbed after passage of the gaseous mixture through a two column adsorption zone (connected in series). The term lean gas refers to a gas passed through only one column of a two column adsorption zone having a fraction of undesirable components less than that of the starting gaseous mixture but more than that of the desired product gas.

A gaseous mixture may be fractionated, or separated, using pressure swing adsorption by passing the mixture at an elevated pressure, hereinafter referred to as the adsorption pressure, through a column of adsorbent which is selective in its capacity to adsorb one or more of the components of the mixture. This selectivity is governed by the pore size distribution in the adsorbent and the pore volume of the proper pore size for adsorption of a particular gas component. Thus, gas molecules with a kinetic diameter less than or equal to the pore size are retained, or adsorbed, on the adsorbent while gas molecules of larger diameters pass through the column. The adsorbent, in effect, sieves the gas according to the component's molecular size. The gaseous mixture may also be fractionated because of different rates of diffusion of its components into the pore system of the adsorbent.

As the gas travels through the adsorbent column, the pores are filled with gas molecules. One can envision an adsorption front, moving through the column, akin to the liquid adsorption front moving through a solid adsorbent in a column chromatography system. After some time the gas exiting the column is essentially the same in composition as the gas that entered the adsorbent. This is known as the "breakthrough" point. At some time before this breakthrough point, the column must be regenerated.

After treatment of the mixture to adsorb selected components therefrom, the flow of the gaseous mixture through the column is interrupted and the adsorbent is regenerated for reuse by purging it of the adsorbed components either by vacuum or by passing through the column, generally in the opposite direction of flow taken by the gaseous mixture, a purge gas stream which may comprise a portion of the purified product at a low pressure.

Pressure swing adsorption usually includes at least two columns of adsorbent so that while one column is being regenerated, the other is in the adsorption phase producing product gas. Thus, by cycling between the columns product gas is obtained constantly. The term adsorption zone, as used herein, refers to a serial arrangement of two adsorption columns, i.e., during adsorption, gas enters the inlet of the first column in the zone and exits the zone via the outlet of the second column comprising the zone. When using two such zones, by cycling between these zones, product gas is obtained constantly.

The recovery of oxygen enriched air utilizing an adsorption process employing siliceous or carbon containing adsorption agents and involving the use of temperature or pressure changes during adsorption and desorption is well known. See for example, Nandi and Walker, *Separation Science* 11 441 (1976), "Separation of Oxygen and Nitrogen Using 5 A Zeolite and Carbon Molecular Sieves." Certain silicates, as for example zeolites, are effective for preferably adsorbing nitrogen from its mixtures with oxygen so that by conducting air through a zeolite filled column, the first issuing gas is effectively enriched in oxygen content. The regeneration of zeolites however requires considerable expense in terms of energy and apparatus. For example Wilson in U.S. Pat. No. 3,164,454 describes the separation of oxygen from air using zeolites.

A well known process is the use of carbon molecular sieves for the production of enriched nitrogen from air. See for example, Vesterdal, U.S. Pat. No. 2,556,859 and Münzner et al., U.S. Pat. No. 3,960,522. These sieves possess a pore structure with a size comparable to the kinetic diameter of oxygem. When used in a pressure swing adsorption systen, these sieves selectively adsorb oxygen from a gas mixture, allowing other components to pass.

A four column pressure swing adsorption unit has been successfully employed in the separation of hydrogen gas from its mixture with carbon dioxide, water and light aliphatic hydrocarbons. See for example, Wagner in U.S. Pat. No. 3,430,418.

Also well known is the fractionation of other binary gas mixtures by pressure swing adsorption. For example, carbon monoxide from its mixture with hydrogen using zeolite 13X and carbon dioxide from its mixture with fuel gas mixtures using charcoal, alumina or silica. See, Simonet, U.S. Pat. No. 3,884,661.

Binary gas mixtures of argon and oxygen or helium and methane have been separated on an adsorbent of partially oxidized carbon in a pressure swing adsorption process. See, German Auslegungsschrift No. 2,045,200.

Typical problems in the present carbon molecular sieve technology include; low yield of product gas, large amounts of molecular sieve required and energy inefficient regeneration methods.

SUMMARY OF THE INVENTION

The invention relates to a four-column pressure swing adsorption process for fractionating a gaseous mixture through two columns containing molecular sieve carbon arranged in series, herein called the adsorption zone, at a pressure selected from within the range of 3.0 to 8.0 bars, subsequently reducing the pressure of the adsorption zone to atmospheric level by countercurrently venting the residual gas in the interstices of the carbon columns and a part of the adsorbed gas, regenerating the carbon columns of the adsorpton zone by vacuum in the range of 70 to 250 torr, partially restoring the pressure of the adsorption zone by introducing the gas exiting the second carbon column of a second serially connected two column adsorption zone (also referred to as lean gas) into its inlet to about 40 to 90% of the adsorption pressure while feeding the gaseous mixture solely through the inlet of the second carbon column of this other adsorption zone, stopping the lean gas flow, and further restoring the adsorption pressure completely by introducing product quality gas into the zone's outlet end, and then repeating sequence, treating the second zone as the first zone and vice versa.

BRIEF DESCRIPTION OF THE DRAWING

The FIGURE is a schematic representation of one apparatus capable of employing the gas fractionation and repressurization process described herein.

DETAILED DESCRIPTION

There is provided an adsorption process for the generation of a stream of enriched gas which comprises the sequential steps of passing a gaseous mixture at a pressure selected from the range of 3.0 to 8.0 bars, through a first adsorption zone having a first and a second column of carbon molecular sieves, connected in series, yielding enriched gas, prior to breakthrough, isolating said first column of said first adsorption zone, thereafter passing the gaseous mixture through the second column of this first adsorption zone, thereby producing lean gas and passing said lean gas from said second column of said first adsorption zone into the inlet end of a second adsorption zone having a first and a second column of carbon molecular sieves, connected in series, thereby partially pressurizing said second adsorption zone in a range of 40 to 90% of the adsorption pressure, thereafter halting the lean gas flow and further pressurizing the second adsorption zone to the adsorption pressure by the introduction of enriched gas of product quality (generally, but not exclusively from the product reservoir) through the outlet end of the zone, venting said first column of the first adsorption zone to atmospheric pressure, countercurrently venting the second column of the first adsorption zone, using said vented gas to countercurrently purge the previously vented first column in the zone, passing the gaseous mixture through the pressurized second adsorption zone to yield enriched gas while regenerating the entire first adsorption zone by the use of vacuum applied to the inlet end of the zone in the range of 70 to 250 torr and repeating the cycle prior to breakthrough, generally upon reaching an undesirable level of previously adsorbed (unwanted) gas in the enriched gas stream.

The system for employing the fractionation and repressurization technique of this invention can be better understood by reference to the accompanying drawing which shows a two zone pressure swing adsorption unit capable of fractionating a binary gas mixture in accordance with this invention. Although the present invention is described and illustrated in connection with a preferred embodiment, it is to be understood that modifications and variations may be used without departing from the spirit of the invention. For example, any gaseous mixture including, but not limited to, air (nitrogen and oxygen), methane and carbon dioxide, or hydrogen and carbon monoxide will suffice.

Referring to the drawing in detail, there is shown four pressure resistant columns A & B and C & D, each of which is filled with carbon molecular sieves suitable for the fractionation of nitrogen from air. Generally, these carbon molecular sieves have a controlled pore structure which is developed during the manufacture of the sieve. This pore structure allows for the discrimination and hence separation of gases of different molecular size. One carbon sieve useful in this process is described in Jüntgen et al., U.S. Pat. No. 4,124,529. In general, any adsorbent capable of screening out one or more components of a gaseous mixture based on a molecular size differential, may be employed in this process. Columns A & B comprise the first adsorption zone (zone-1) while columns C & D comprise the second adsorption zone (zone-2). Each zone has an inlet end (zone-1=Column A, zone-2=Column C) and an outlet end (zone-1=Column B, zone-2=Column D).

The series of valves connecting the pressure resistant columns may be defined by the number shown in the drawing and by the function performed in this one preferred arrangement:
(a) Valves 0 & 1—main air flow valves.
(b) Valves 2, 7 & 11, 16—inlet air valves to columns A, B & C, D respectively.
(c) Valves 3 & 12—regeneration valves—vacuum pump for zones 1 & 2.
(d) Valves 4 & 13—purge valves—release column pressure for zones 1 & 2.
(e) Valves 10 & 19—product flow valves—from adsorption zones 1 & 2.
(f) Valves 20, 8 & 17—backfilling valves—product quality gas introduced into outlet end of zones 1 & 2 after partial repressurization.
(g) Valves 9, 14, 15 & 5, 6, & 18—exiting (lean) gas connection between outlet of first adsorption zone and inlet of second adsorption zone.
(h) Valves 6 & 15—zone purge connection—gas from second half of zone used to purge first half.

While housings A, B, C and D are shown in the vertical position, they may be installed in either the horizontal or vertical position without adverse effect to the mode of operation.

Ambient air is compressed and dried and introduced into the system via either valve 0 or valve 1. The ambient air may be modified, prior to adsorption, by passing it through a condenser to remove excess humidity as a relative humidity of less than 40% is preferred. Also, a filter or scrubber may be employed to remove other gasses such as carbon dioxide, sulfur dioxide or oxides of nitrogen. These steps improve the purity of the enriched gas stream and are employed when the specification for extremely pure enriched gas (e.g., nitrogen) mandates such prior removal. They are however auxiliary and not requisite to the successful operation of this invention.

Air is admitted to either zone-1 or zone-2 at the adsorption pressure via valve 0 and either valves 2 & 6 or valves 11 & 15 to selectively sieve oxygen and the air is pushed through the adsorption zone. Enriched nitrogen gas is discharged from zone-1 or zone-2 via either valve 10 or valve 19 respectively. The instantaneous nitrogen flow rate is measured by a mass flow meter and the enriched gas oxygen content is analyzed upstream from the enriched reservoir. A stream of enriched nitrogen gas is discharged from the product reservoir to keep its pressure constant.

When one adsorption zone is generating enriched nitrogen gas, the other zone is being regenerated by vacuum applied via valves 3 or 12. Thus, while zone-1 is producing nitrogen via open valves 0, 2, 6 and 10, zone-2 is being regenerated by vacuum in the range of 70 to 250 torr via open valve 12.

Prior to reaching the breakthrough point of an adsorption zone, when an analysis of the enriched nitrogen gas oxygen content shows that an undesirable level of oxygen, for example, greater than from 1 to 10% has been reached valves 0, 2, 6, and 10 or valves 0, 11, 15 and 19 are closed. The first column of zone-1 (column A) or zone-2 (column C) is thus isolated. Air is then admitted solely into the second column of zone-1 (column B) or zone-2 (column D) via valves 1 and 7 or 1 and 16 respectively. The lean gas exiting from this column flows through either valves 9, 14 and 15 or valves 18, 5 and 6 to the inlet end of zone-2 or zone-1. This lean gas is used to partially pressurize the other zone to a range of 40-90%, preferably 60-70%, of the adsorption pressure. After this step the lean gas flow is ceased and the partially pressurized zone is further pressurized to the adsorption pressure by the introduction of enriched product nitrogen gas via valves 20 and 17 for zone-2 or valves 20 and 8 for zone-1 from the product reservoir. During this time the isolated first column of the first adsorption zone is returned to atmospheric pressure by venting through valves 3, 4 or 13. Once the partial repressurization (lean gas) phase is completed, the second column of the adsorption zone (i.e., Column B or Column D) is countercurrently depressurized via valve 6 or valve 15 and the previously vented, and isolated first column (i.e., column A or Column C) is purged with the residual gas from the second column in the zone. The fully pressurized adsorption zone now receives feed air via valve 0 and either valve 11, 15 or valve 2, 6 and enriched gas is released via valves 19 or 10. While one adsorption zone is producing nitrogen gas, the other adsorption zone is being regenerated by the application of vacuum in the range of 70 to 250 torr via valve 3 or valve 12. The cycle is repeated prior to zone breakthrough, generally when the oxygen content of the enriched gas from the second adsorption zone again reaches an undesirable level, for example greater than from about 1 to 10 percent.

What is claimed is:

1. An adsorption process for producing an enriched gas stream which comprises the sequential steps of:
    (a) passing a gaseous mixture, at an adsorption pressure selected from the range of from 3.0 to 8.0 bars through a first adsorption zone comprising a first and a second column of carbon molecular sieves connected in series to yield enriched gas, said enriched gas flowing to a product reservoir;
    (b) prior to breakthough, isolating said first column of the first adsorption zone, thereafter passing the gaseous mixture through solely the second column of said first adsorption zone, thereby producing lean gas and passing said lean gas from the second column of said first adsorption zone into the inlet end of a second adsorption zone comprising a first and a second column of carbon molecular sieves connected in series, to partially pressurize said second adsorption zone in the range of about 40 to 90% of said adsorption pressure thereafter halting said lean gas flow;
    (c) further pressurizing of said second adsorption zone to said adsorption pressure by introducing enriched gas from said product reservoir into the outlet end of said second adsorption zone;
    (d) venting said isolated first column of the first adsorption zone to the atmosphere through its inlet end, and countercurrently venting the second column of said first adsorption zone thereby producing vented gas and using said vented gas to countercurrently purge the previously vented first column in the zone;
    (e) passing said gaseous mixture through said fully pressurized second adsorption zone to yield enriched gas while regenerating said first adsorption zone by application of vacuum to the inlet end of said first zone in the range of 70 to 250 torr;
    (f) repeating the sequence, steps (b)-(e) treating said second zone as said first zone and said first zone as said second zone.

2. The adsorption process of claim 1 wherein the gaseous mixture is air and the enriched gas is from about 90 to 99% nitrogen.

3. The adsorption process of claims 1 or 2 wherein the lean gas is admitted to partially pressurize the second adsorption zone to about 70% of the adsorption pressure.

* * * * *

UNITED STATES PATENT AND TRADEMARK OFFICE
CERTIFICATE OF CORRECTION

PATENT NO. : 4,376,639

DATED : March 15, 1983

INVENTOR(S) : Toan P. Vo

It is certified that error appears in the above-identified patent and that said Letters Patent is hereby corrected as shown below:

On the title page, Item [73] should read

-- Calgon Corporation,

Robinson Township, Allegheny County, Pa. --.

Signed and Sealed this

Fifth Day of June 1984

[SEAL]

Attest:

GERALD J. MOSSINGHOFF

Attesting Officer     Commissioner of Patents and Trademarks